US009855580B2

(12) United States Patent
Agnello

(10) Patent No.: US 9,855,580 B2
(45) Date of Patent: Jan. 2, 2018

(54) CAULKING TUBE ASSEMBLY AND METHOD FOR TINTING CAULKING

(71) Applicant: Charles J. Agnello, Lewiston, NY (US)

(72) Inventor: Charles J. Agnello, Lewiston, NY (US)

( * ) Notice: Subject to any disclaimer, the term of this patent is extended or adjusted under 35 U.S.C. 154(b) by 0 days.

(21) Appl. No.: 15/164,560

(22) Filed: May 25, 2016

(65) Prior Publication Data

US 2016/0332188 A1 Nov. 17, 2016

Related U.S. Application Data

(63) Continuation-in-part of application No. 13/778,615, filed on Feb. 27, 2013, now Pat. No. 9,352,488.

(60) Provisional application No. 61/604,592, filed on Feb. 29, 2012.

(51) Int. Cl.

| | |
|---|---|
| ***B01F 3/14*** | (2006.01) |
| ***B29B 7/14*** | (2006.01) |
| ***B05C 17/005*** | (2006.01) |
| ***B05C 17/01*** | (2006.01) |
| ***B01F 7/00*** | (2006.01) |
| ***B01F 13/00*** | (2006.01) |
| ***B01F 15/00*** | (2006.01) |

(52) U.S. Cl.

CPC .......... *B05C 17/00553* (2013.01); *B01F 3/14* (2013.01); *B01F 7/00408* (2013.01); *B01F 13/0023* (2013.01); *B01F 13/0028* (2013.01); *B01F 15/00941* (2013.01); *B05C 17/01* (2013.01)

(58) Field of Classification Search

CPC .................................... B01F 3/14; B29B 7/14

USPC ......... 366/247, 249–252, 310, 320; 222/412, 222/413

See application file for complete search history.

(56) References Cited

U.S. PATENT DOCUMENTS

| | | | | |
|---|---|---|---|---|
| 2,673,663 A | | 3/1954 | Calabro | |
| 3,473,666 A | | 10/1969 | Humbert | |
| 4,090,612 A | * | 5/1978 | Lostutter | B01F 15/00753 211/13.1 |
| 6,910,799 B2 | * | 6/2005 | Renfro | B01F 7/1695 366/169.1 |
| 7,407,321 B1 | * | 8/2008 | Renfro | B01F 7/1695 366/251 |
| 7,798,363 B2 | * | 9/2010 | Brandon | B05C 17/00553 222/1 |
| 7,905,654 B1 | * | 3/2011 | Cordero | B01F 11/0054 366/256 |

(Continued)

*Primary Examiner* — David Sorkin

(74) *Attorney, Agent, or Firm* — Del Vecchio and Stadler LLP

(57) ABSTRACT

A caulking tube assembly is provided having a cap and an auger component, and the auger component has an auger engagement head portion and a helical or spiral portion that is compressible and sized to be fitted in a tube for holding caulk. The auger engagement head has a shaft housing sized to receive a mixing shaft therein. A coloring agent is added to the caulk in the tube and the auger component mixes the caulk and coloring agent to produce a tube of colored caulk. The caulk is thus colored to satisfy the requirements of virtually any application and dispensed from a caulking gun. In another preferred embodiment there is a caulking tube assembly with having a closed cap and a mixing component having a shaft engagement portion and a shaftless auger portion. The caulking tube assembly can also be used to mix epoxy.

13 Claims, 15 Drawing Sheets

(56) References Cited

U.S. PATENT DOCUMENTS

| | | | | |
|---|---|---|---|---|
| 2001/0005338 | A1 | 6/2001 | Muhlbauer et al. | |
| 2006/0151531 | A1* | 7/2006 | Tikusis | B01F 5/0603 222/145.6 |
| 2007/0177455 | A1* | 8/2007 | Renfro | B01F 7/1695 366/143 |
| 2010/0208549 | A1 | 8/2010 | Kitson | |
| 2013/0250713 | A1* | 9/2013 | Agnello | B29B 7/14 366/98 |

* cited by examiner

CAULKING TUBE ASSEMBLY AND METHOD FOR TINTING CAULKING

CROSS REFERENCE TO RELATED APPLICATIONS

This application is a continuation in part of pending U.S. patent application Ser. No. 13/778,615 filed on Feb. 27, 2013 that claims the benefit of U.S. Provisional Patent Application No. 61/604,592 filed on Feb. 29, 2012 and the entire disclosure and content of each are hereby incorporated herein by reference.

FIELD OF INVENTION

This invention is directed to caulking tubes and methods for dispensing caulking out of a tube.

BACKGROUND OF INVENTION

In the home building and remodeling industry, caulk is often used to seal two surfaces, including the seams of walls, floors, sinks, bathtubs, windows, trims, et cetera. The caulk serves as a sealant to prevent leakage of air and moisture between the two surfaces that are joined by the caulk. Because the two surfaces that are joined by the caulk are often visible, the caulk seam is also typically visible. At present, caulk is only available in limited colors, including white, off-white, brown, and clear. This is the case because caulk is typically sold in cartridges that can be quickly inserted into caulk guns for easy and efficient applications. Thus, it is not feasible for manufacturers to make cartridge-packed caulk in a large variety of colors. As a result, if the two surfaces that are being joined together by the caulk are not one of these limited colors, the caulk tends to be rather unattractive because it doesn't blend into the two surfaces.

Currently, there exists no satisfactory color matching methods or systems for custom coloring of caulk such that it would match the two surfaces to which it is being applied. Thus, it would be advantageous to have such a color matching method and system so that a homeowner or contractor could duplicate the color of the one or more surfaces that the caulk is joining so the caulk blends. Further, it would be beneficial if the caulk color matching method and system worked in conjunction with existing paint tinting systems that are already available at many home improvement stores. A consumer would buy a white base colored caulk, and select the desired color and have it matched at the home improvement store. Such a method and system would have many benefits, including allowing the manufacturers to continue making caulk in the few colors presently available without having to enter the caulk coloring business.

SUMMARY

The invention includes a caulking tube assembly and a method for tinting or coloring caulk. The caulking tube assembly has a cap and an auger component. The auger component has an auger engagement head portion and a helical or spiral portion that extends from the auger engagement head portion. The helical portion is compressible and sized to be fitted in a tube for holding caulk. The auger engagement head portion includes a hexagonal shaft housing sized to receive a mixing shaft therein.

To tint or dye the caulk a technician removes a temporary cap from the base of the white colored caulk. Then, a coloring agent such as a dye or tint coloring formula or colored paint is added to the tube on top of the caulk. The auger is installed and a permanent cap is inserted into the top of the tube over the auger. A mixing shaft engages the auger engagement head and rotates the caulk and dye or tint coloring formula until the caulk is a uniform color. The end user places the tube containing the colored caulking in a caulking gun and dispenses the colored caulk in the normal fashion. As the caulk is expelled by way of the caulking gun, the helical portion of the auger engagement head is compressed. The caulk is colored to satisfy the requirements of virtually any application.

In another embodiment, the auger is preinstalled in the tube at the point of manufacture. In this embodiment there is an auger having a mixing shaft receiver, and the mixing shaft receiver is disposed proximal a first end of the tube where the tip of the tube of caulking is disposed. The manufacturer pre-installs the auger having the mixing shaft receiver in the tube. This saves the technician at the store time since he or she does not need to do this task. There is a tip for expelling caulk extending from the tube of caulking. The tip is removed exposing an outlet port on the tube of caulking. A mixing shaft is provided that is adapted to engage the mixing shaft receiver through the outlet port. Thus, the caulk is mixed by a mixing shaft extending through the outlet port on the tube of caulking.

In another preferred embodiment there is a sealed caulking tube assembly comprising a closed cap having a surrounding cap wall and a closed cap end wall that meets with the surrounding cap wall. A shaft housing portion extends from the closed cap end wall and the shaft housing portion has a shaft engagement base wall. In one of the preferred embodiments, the shaft housing portion can be shaped as a hexagonal shaped housing portion that defines a hexagonal recess that sized to receive a mixing shaft therein. The surrounding cap wall and the shaft housing portion are impervious to fluid flow. The surrounding cap wall is cylindrical shaped and the hexagonal shaped housing extends in a direction away from the surrounding cap wall and protrudes from the closed cap end wall.

The sealed caulking tube assembly further includes a mixing component having a shaft engagement portion and a shaftless auger portion. In one preferred embodiment the shaft engagement portion and the shaftless auger portion are formed a one piece body. The shaftless auger portion includes a helical blade that is compressible. The shaft engagement portion includes a hexagonal receiving housing and the hexagonal shaped housing portion of the closed cap is disposed in the hexagonal receiving housing.

The sealed caulking tube assembly is sized such that it can be disposed in a tube filled with caulk.

It is pointed out that the caulk mentioned above is white before a coloring agent such as a dye, a tint coloring formula or colored paint is added. In another preferred embodiment the caulk is embodied as clear caulk that is clear when cured, that is, the clear caulk has no color when cured. Then, one of the dye or tint coloring formula or colored paint is used to color the clear caulk. Thus, when, for example, a dye is added to the clear caulk the clear caulk takes on the color of the dye such that the clear caulk takes on the same or substantially the same color as the dye when mixed and when cured.

It is further pointed out that the above-described caulking tube assembly and sealed caulking tube assembly comprising can be used to mix two epoxy components such that mixed epoxy can be dispensed from the tube. The coloring agent is replaced with a first epoxy component, and the caulk is replaced with a second epoxy component such that mixed epoxy can be dispensed.

DESCRIPTION

Figure 1:
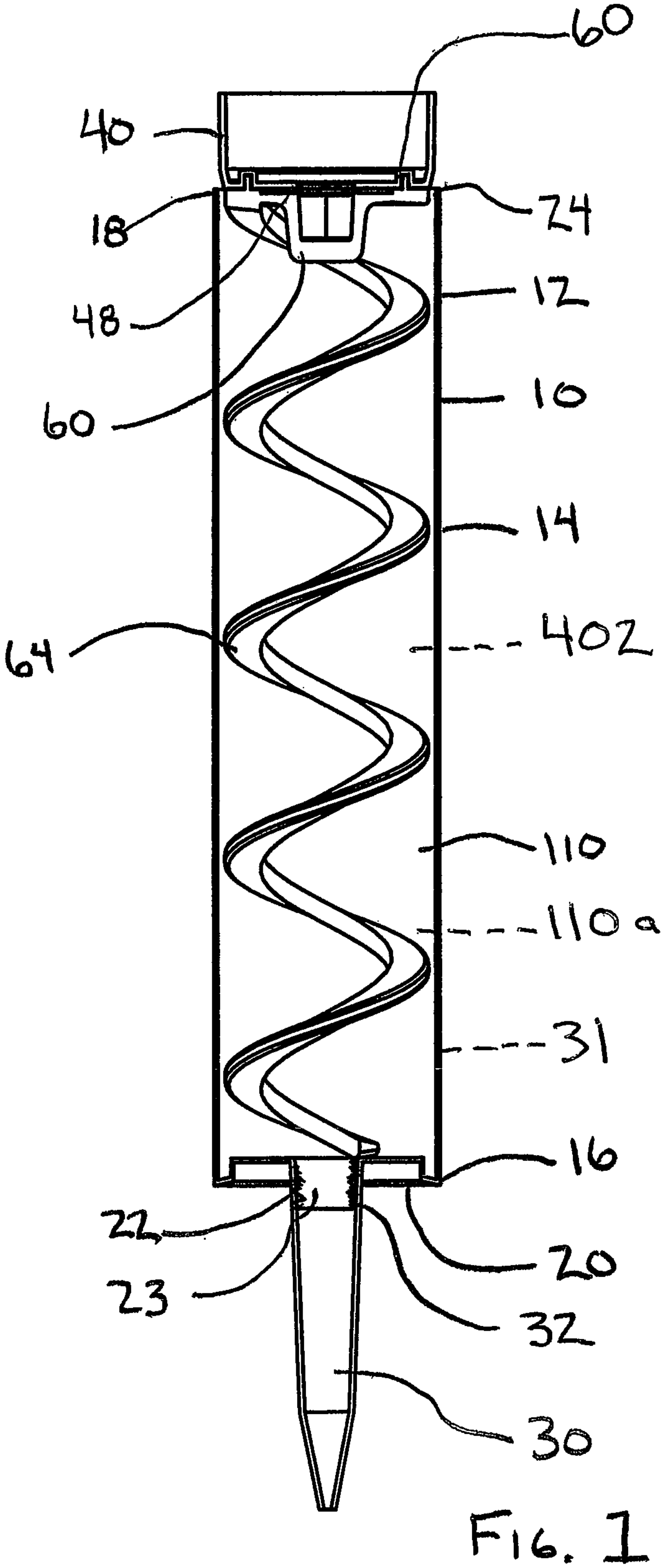
FIG. 1 is a sectional view of a caulking tube assembly.

As shown in FIG. 1 there is sectional view of a caulking tube assembly 10. The caulking tube assembly 10 includes a tube 12. The tube 12 has an elongated cylindrical shaped portion 14, a first end 16 and an opposed second end 18. Joined to the first end 16 is an end wall 20. Extending from the end wall 20 is a centrally disposed externally threaded outlet tube 22 that defines an outlet opening 23. The tube 12 and the end wall 20 define a recess 24 such that the tube 12 is hollow. The tube 12 is loaded with caulk 110, and a removable disposable lid 200 (FIG. 9) closes the tube 12. The lid may also be embodied as a reusable lid 200*a*. In another preferred embodiment the removable disposable lid 200 is embodied as a lid 200*a* that may be reused. The tube 12 is made of plastic, cardboard, coated cardboard or other suitable material capable of containing caulk 110. A tip 30 having an internal thread 32 is threaded to the externally threaded outlet tube 22 that extends from the end wall 20. It is pointed out in another preferred embodiment the above-described internal thread 32 and the externally threaded outlet tube 22 are not present, and the tip 30 is formed as part of the end wall 20, such that the end wall 20 and tip 30 are formed a unitary piece during the manufacture thereof and joined to the end wall 20 or is formed as part of the end wall 20. In such an embodiment the tip 30 does not require the above-described internal thread 32. In another preferred embodiment the tip 30, end wall 20 and the tube are formed as a one-piece body as indicated by dashed line 31.

As shown in FIGS. 2-6, the caulking tube assembly 10 further includes a cap 40 and an auger component 60.

Figure 3:
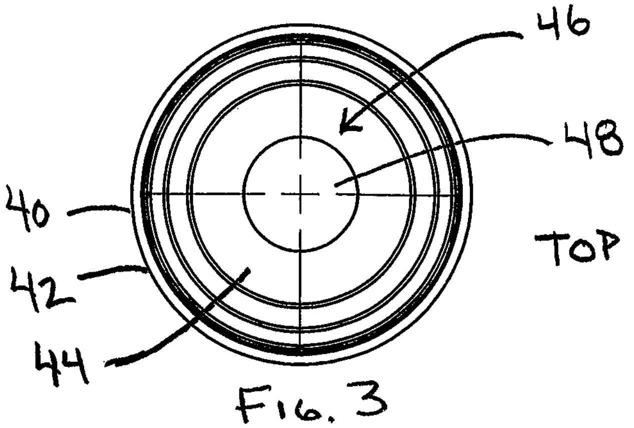
FIG. 3 is a top plan view of the cap.
Figure 2:
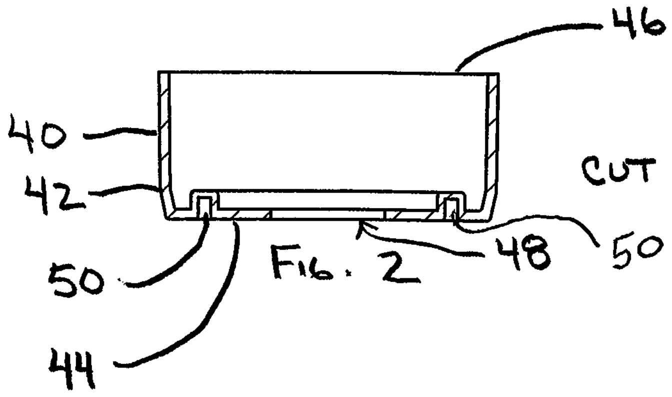
FIG. 2 is a front elevational view of a cap.

As shown in FIGS. 2 and 3, the cap 40 has a cylindrical shaped surrounding wall 42 that meets with a cap end wall 44. The cap 40 has a cap opening 46 opposite the cap end wall 44. The cap end wall 44 defines a shaft opening 48 that may have a diameter of about ⅝ of an inch in one of the preferred embodiments. Extending into the surrounding wall 42 of the cap 40 is a pair of slots commonly designated 50.

Figure 4:
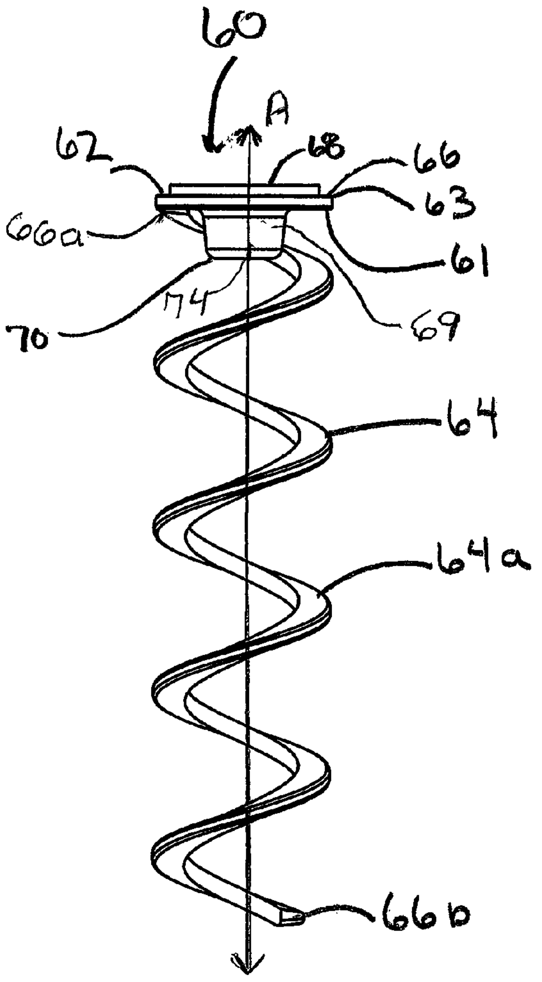
FIG. 4 is a front elevational view of an auger component.
Figure 5:
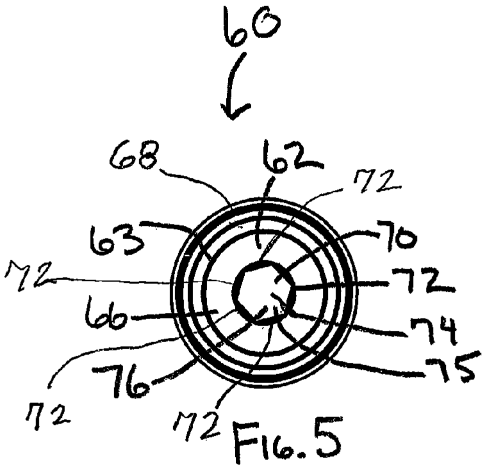
FIG. 5 is a top view of the auger component.
Figure 6:
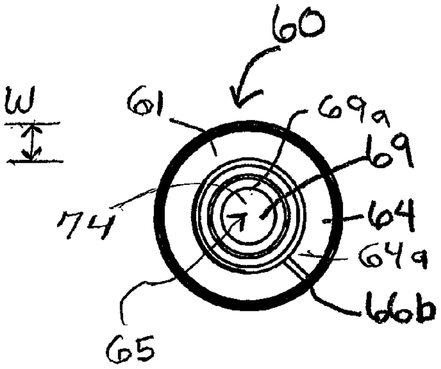
FIG. 6 is a bottom view of the auger component.

The auger component 60 is shown in FIGS. 4-6. The auger component 60 has an auger engagement head portion 62 and a helical (or spiral) portion 64. The auger engagement head portion 62 has opposed first and second auger head sides 61, 63. The helical portion 64 has opposed first and second first helical ends 66*a*, 66*b*. The first helical end 66*a* is joined with and extends from the first auger head side 61 of the engagement head portion 62. The auger engagement head portion 62 and the helical portion 64 are formed as a one-piece body in one of the preferred embodiments, and the auger component 60 is made of plastic in one of the preferred embodiments. In addition, the spiral portion 64 is made from flexible plastic in one of the preferred embodiments such that the spiral portion 64 is compressible. The auger component 60 has a central axis designated A in FIG. 4 that extends through the auger component 60, and the helical portion 64 is compressible and expandable in the direction of the central axis A. In one of the preferred embodiments the spirals 64*a* of the helical portion 64 have a width, designated W in FIG. 6, of about ¼ of an inch and a thickness of about ⅛ of an inch (FIG. 4), and the helical portion 64 defines a hollow helical core 65 (FIG. 6) that extends along the central axis A.

As shown in FIGS. 4 and 5 the second auger head side 63 of the auger engagement head portion 62 has a flat portion 66 from which extends a cap engagement lip 68. The cap engagement lip 68 has a circular shape and is sized such that it is capable of being received in the pair of slots 50 defined in the cap 44, thus interlocking the cap 44 and the auger component 60. Joined with and extending from the first auger head side 61 in a direction towards the helical portion 64 is a sided shaft housing 69 that has three or more internal sides and exterior surface 69*a* that may be smooth. In one of the preferred embodiments the sided shaft housing 69 is a hexagonal shaft housing 70 having six such side walls commonly designated 72. The six side walls 72 are disposed relative to one another to form a hexagonal shape, each of which is joined to a hexagonally shaped base wall 74 as shown in FIG. 5. The hexagonal shaped housing 70 defines a hexagonally shaped opening 75 that extends into a hexagonally shaped recess 76, also shown in FIG. 5.

Figure 7:
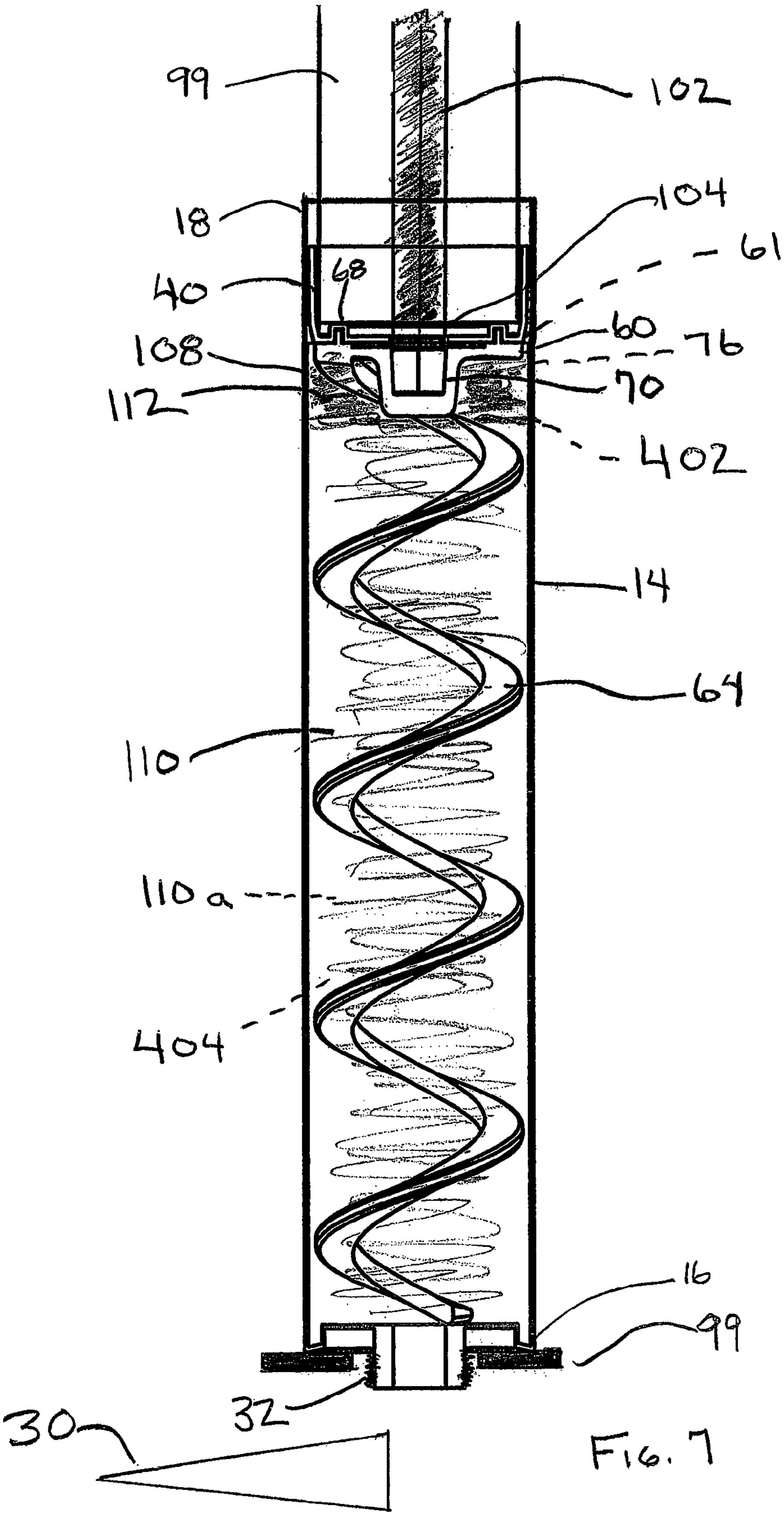
FIG. 7 is a diagrammatic view of a mixing shaft engaged with the caulking tube assembly.

As shown in FIG. 7, there is a mixing shaft 102 having a hexagonal cross section and a hexagonal-shaped shaft end portion 104. The hex shaft end portion 104 is sized such that it can be received in the hexagonal shaft housing 70 when the caulking tube assembly 10 is fitted in a mixing machine 99. Upon rotation of the mixing shaft 102 by a source of rotation, for example a mixer motor (not shown) of the mixing machine 99, the helical portion 64 of the auger component 60 is rotated and churns the caulking 110 and a dye or a tint coloring formula 112 contained with in the tube 12 as will be described in greater detail presently.

In use, a buyer, for example a large home improvement store, purchases the caulk 110 in bulk and in tubes 12 with removable disposable lids 200. At this point, the caulk 110 has a base white color. Then a consumer orders a custom color of caulk, for example light green to match the color of tiles being caulk. The technician or worker at the store removes the removable disposable lid 200 revealing the caulk 110 in the tube 12. There is a space defined between the end of the tube 12 and the caulk 110 in the tube 14. The worker adds a coloring agent 108 into the tube 12 and the coloring agent may be any of the following: a dye, a tint coloring formula, or colored paint all of which are commonly designated by reference number 112. In one of the preferred embodiments the worker adds the dye or tint color formulation 112 that is used to make an eight ounces (8 oz.) sample of paint in the desired color. In other words, the amount of dye or tint coloring formula 112 that is added is approximately the same amount that would be added for dying or tinting an equivalent amount of paint. The dye or tint coloring formula 112 is the same as the dyes and tint coloring formula that is used in connection with dying or tinting paint in one of the preferred embodiments.

It is pointed out that in another preferred embodiment the caulk is embodied as clear caulk **110*a* (indicated by in dashed line in FIG. 7 and throughout the drawing figures), as opposed to being white or some other color. The clear caulk 110*a* is clear when cured, that is, the clear caulk 110*a*** has no color and is clear when fully cured.

The dye or tint coloring formula or the colored paint 112 that is added to the clear caulk **110*a* causes the clear caulk 110*a* to have the same or substantially the same color of the dye or tint coloring formula or colored paint 112, or in other words, the color of the coloring agent 108**.

Figure 8:
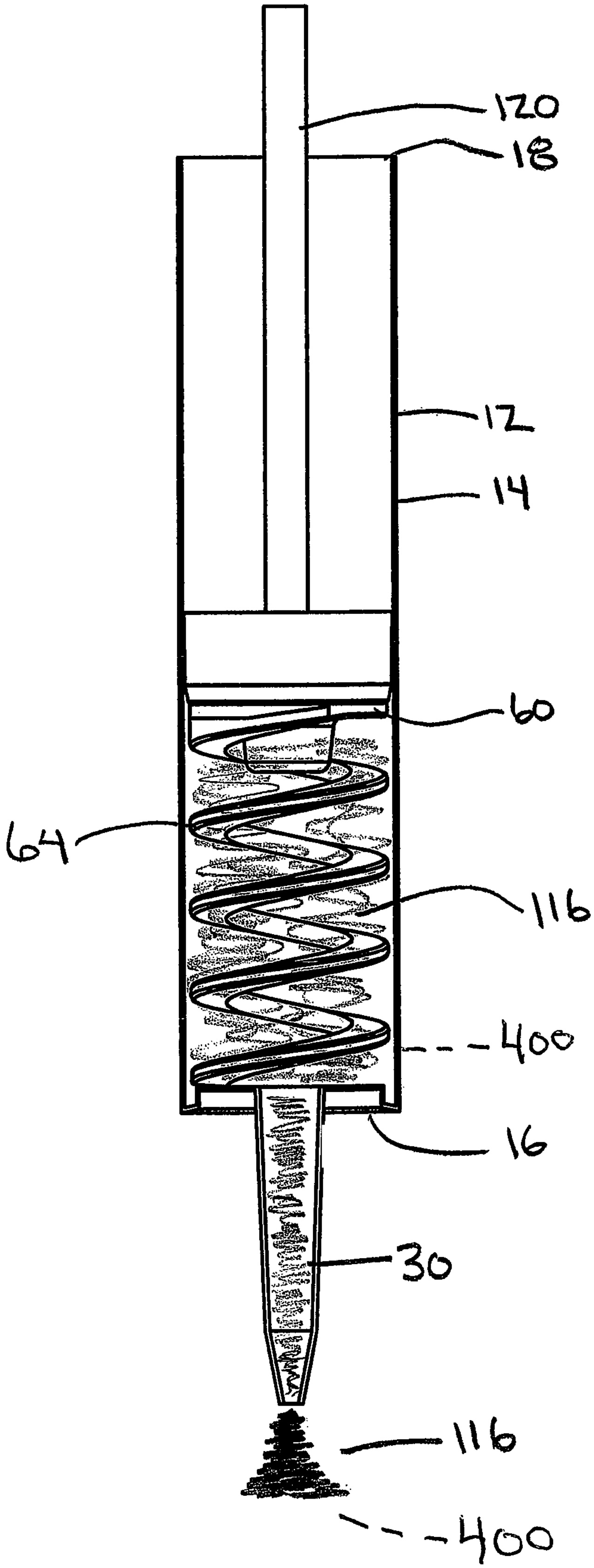
FIG. 8 is a sectional view of a caulk gun as caulking is dispensed from a tube housing the caulking tube assembly.

After the dye or tint coloring formula or colored paint 112 has been added to the tube 14, the worker slowly lowers the auger component 60 into the tube 14 and attaches the cap 40 to the tube 14 such that the cap 40 is attached to the tube 14. Next, the worker places the tube 14 onto the mixing machine 99 and the helical shaft 102 engages the hexagonal shaft housing 70 of the auger component 60. As the mixing machine 99 rotates the helical portion 64 of the auger component 60 is rotated and stirs and churns the caulk 110 and dye or tint coloring formula 112. The mixing continues for a period time sufficient time to thoroughly mix the caulk 110 and the dye or tint color formula or colored paint 112, after which time the worker removes the tube 14 from the mixing machine 99. The worker hands the tube 12 now, now a tube filled with colored caulk 116 to the customer. It is pointed out that the entire mixing process is clean because the caulk 110 is contained at all times during the mixing process, and there is no cross contamination between different dyes or tint coloring formulas or colored paints 112. Thus, there is no cleanup required by the store. As shown in FIG. 8, the customer installs the tube 12 in a standard caulking gun 120 and dispenses the now colored caulk 116 in the usual manner. As the colored caulk 116 is expelled out of the tip 30 the spiral portion 64 of the auger component 60 compresses. When the tube 12 is empty the tube 12 and the auger component 60 are disposed of in a suitable trash receptacle. It is pointed out that the mixing machine 99 may be embodied as a hand held drill motor.

The above-described caulk 110 may be latex caulk in one of the preferred embodiments. In other preferred embodiments the caulk 110 made of be replaced with a silicone caulk or a butyl caulk or a clear caulk **110*a*** and other caulks well known to those having ordinary skill in the art. The silicone caulk is mixed with a dye or tint coloring formula suitable for use with silicone caulk, and the butyl caulk is mixed with a dye or tint coloring formula suitable for use with butyl caulk.

Figure 9:
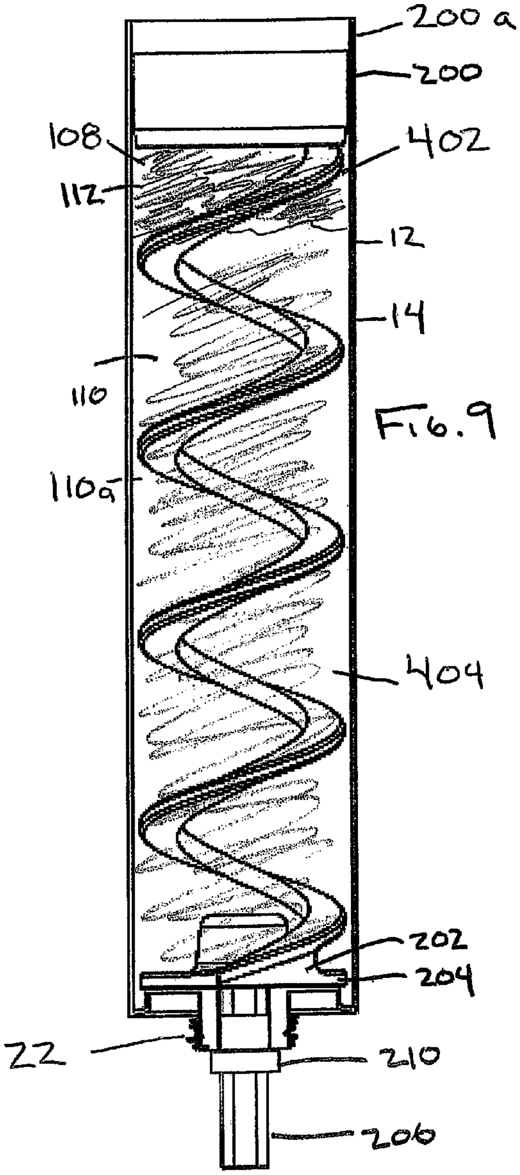
FIG. 9 is a sectional view of another second embodiment showing a caulking tube assembly and a tip of a mixer shaft.
Figure 10:
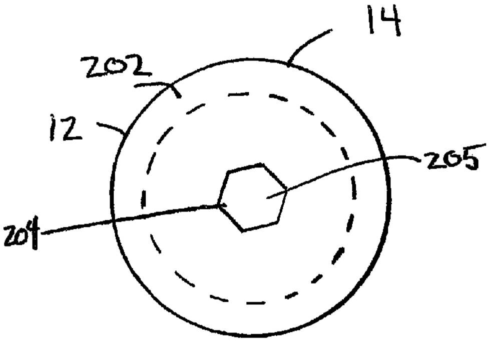
FIG. 10 is an end view of the second embodiment.

FIGS. 9 and 10 show a second preferred embodiment wherein a standard tube of caulk and a removable disposable lid 200 are utilized or a reusable lid **200*a*. There is an auger 202 having a mixing shaft receiver 204, and the mixing shaft receiver 204 is disposed proximal the first end 16 of the tube 12. The manufacturer pre-installs the auger 202 with the mixing shaft receiver 204 in the tube 12. This saves the technician at the store time since he or she does not need to do this task. The mixing shaft 206 is shaped to engage a mixing shaft opening 205 defined by the mixing shaft receiver 204 and the mixing shaft 206 may have a square or hexagonal shape. In addition, the mixing shaft 206 is passed though the externally threaded outlet tube 22 until a shaft seal 210 that is disposed on the mixing shaft 206 engages an internal surface of the externally threaded outlet tube 22. The shaft seal 210 ensures that there are no leaks during the mixing process. After mixing the tip 30 is threaded to the externally threaded outlet port 22**.

It is pointed out that the in another preferred embodiment, the cap 40 and an auger component 60 are made as a one piece body cap and auger body 61 (FIG. 7 and indicated by a dashed lead line), for example in the same mold.

Figure 11:
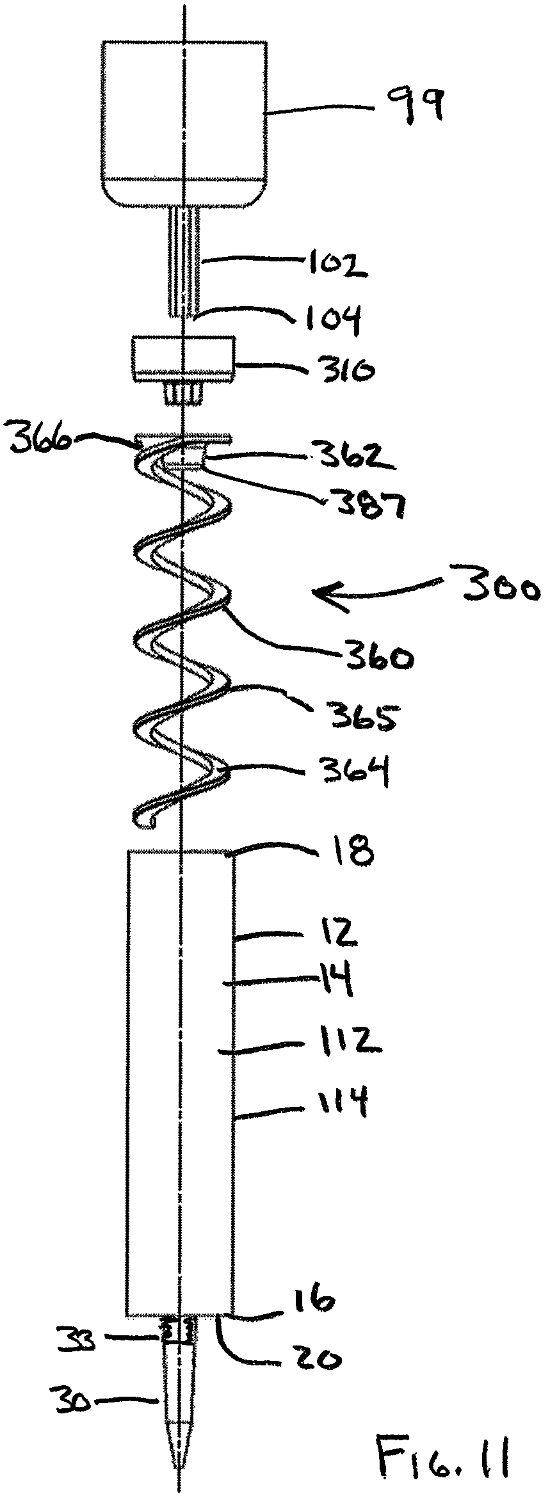
FIG. 11 is an exploded view of a third embodiment that includes a sealed caulking tube assembly.

FIG. 11 shows third preferred embodiment wherein there is a sealed caulking tube assembly 300. Also shown is the tube 12 that is the same as the tube 12 previously described and it has an elongated cylindrical shaped portion 14, a first end 16 and an opposed second end 18. Joined to the first end 16 is an end wall 20. There is a tip 30, and the tip 30 and the end wall 20 can be formed as one piece with the end wall 20 as previously described, or the tip 30 can have an internal thread 32 and threaded to the externally threaded outlet tube 22 as previously described.

Figure 12:
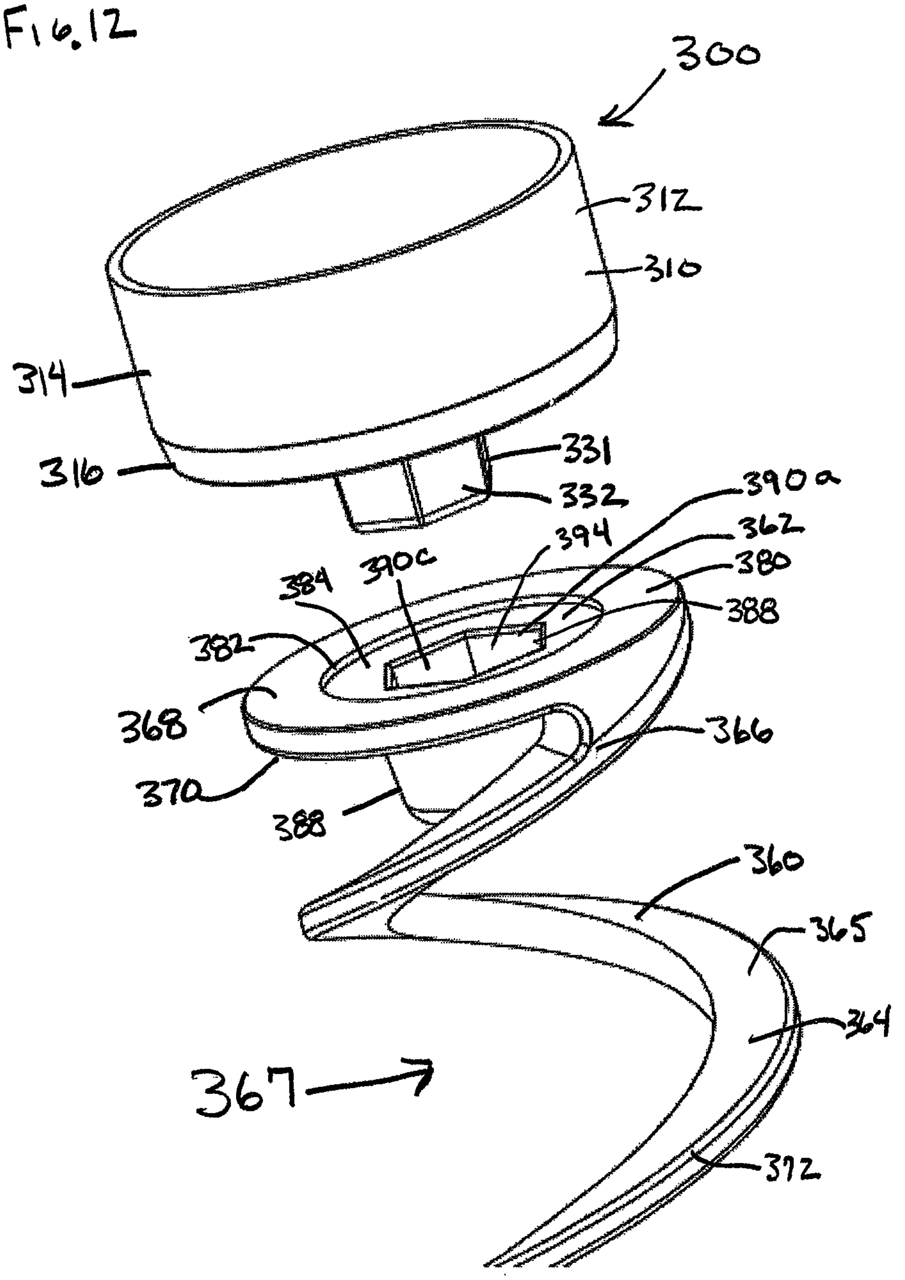
FIG. 12 is a perspective view of a closed cap and a mixing component.
Figure 13:
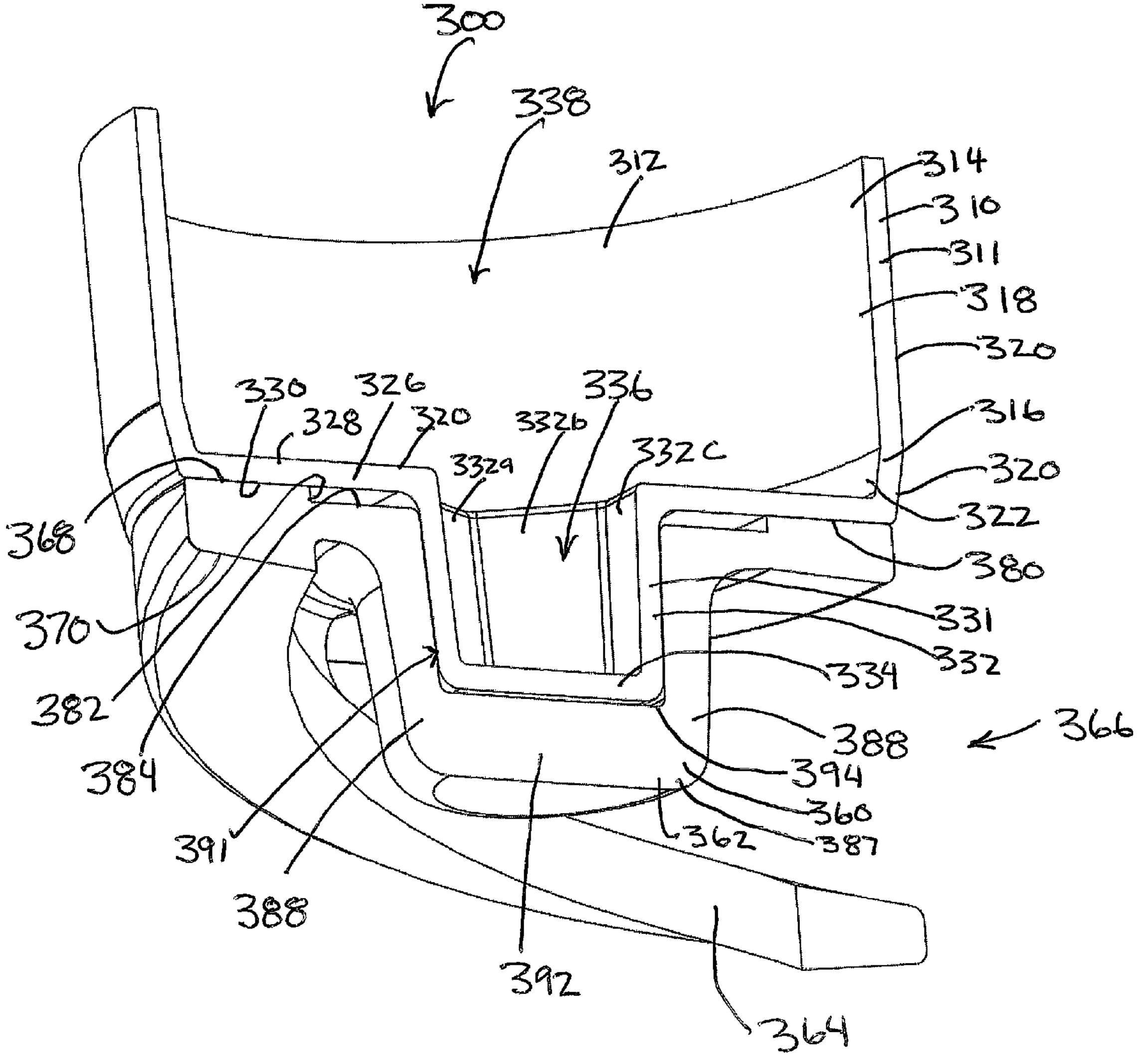
FIG. 13 is a sectional view of the closed cap when received in the mixing component.
Figure 13A:
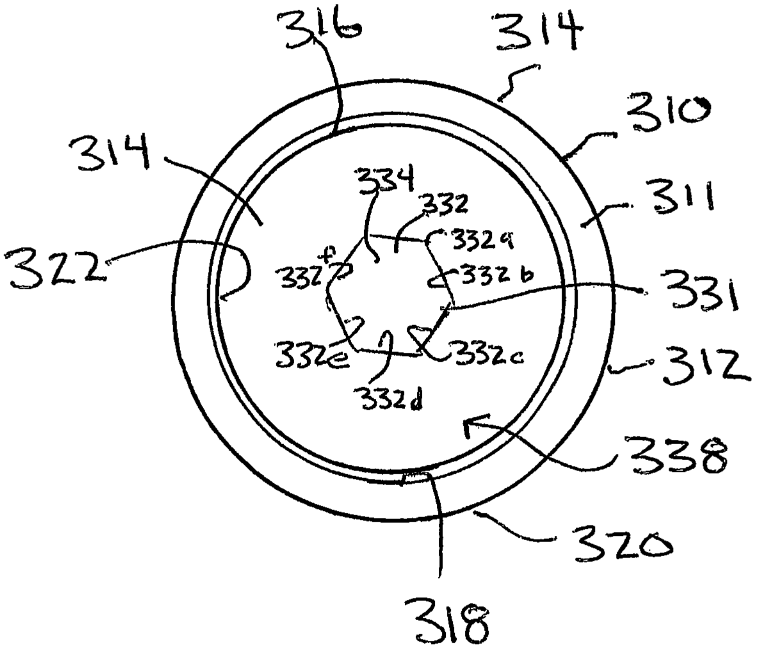
FIG. 13*a* is a top plan view of a closed cap.

As shown in FIGS. 11-14, the sealed caulking tube assembly 300 includes a closed cap 310 and a mixing component 360. As best shown in FIGS. 13 and **13*a*, the closed cap 310 of the sealed caulking tube assembly 300 is, in one of the preferred embodiments, made of plastic or other suitable material. The closed cap 310 includes a surrounding cap wall 312 having cylindrical shaped body portion 314, and the closed cap 310 has a tapered portion 316 that meets with the cylindrical shaped body portion 314. The surrounding cap wall 312 has opposed internal and external surrounding cap wall surfaces 318, 320 and the tapered portion 316 has opposed internal and external tapered portion surfaces 322, 324. In another preferred embodiment the surrounding cap wall 312 is formed without the tapered portion 316**.

The tapered portion 316 meets with the closed cap end wall 326 having opposed inner outer end wall surfaces 328, 330. The closed cap 310 also includes shaft housing portion 331 that may be variously shaped and define variously shaped recesses, for example a rectangular shaped recess. In one of the preferred embodiments the shaft housing portion 331 is a hexagonal shaped housing portion 332 that extends from the closed cap end wall 326 in a direction away from the surrounding cap wall 312, and as shown, protrudes from the closed cap end wall 326. The hexagonal shaped housing portion 332 includes six shaft engagement walls **332*a*, 332*b*, 332*c*, 332*d*, 332*e* and 332*f* that meet with a shaft engagement base wall 334. The hexagonal shaped housing portion 332 defines a mixing shaft recess 336 that is hexagonal shaped. It is noted that in other preferred embodiments the hexagonal shaped housing portion 332** may be differently shaped, for example it could be a rectangular shaped housing.

Thus, the closed cap 310 defines a closed cap interior 338 that is defined by the internal surrounding cap wall surface 318, the internal tapered portion surface 322, the end wall inner surface 328, and the six shaft engagement walls **332*a*, 332*b*, 332*c*, 332*d*, 332*e* and 332*f* and the shaft engagement base wall 334. In addition, the closed cap 310** is leak proof in that it does not define any openings through which fluid can flow.

The mixing shaft recess 336 that is sized to receive the previously described hexagonal-shaped shaft end portion 104 of the mixing shaft 102 therein. In particular, when the hexagonal-shaped shaft end portion 104 of the mixing shaft 102 is disposed in the mixing shaft recess 336 the hexagonal-shaped shaft end portion 104 of the mixing shaft 102 abuts against the shaft engagement base wall 334 and the six shaft engagement walls 332*a*, 332*b*, 332*c*, 332*d*, 332*e* and 332*f*. For illustrative purposes only, the hexagonal-shaped shaft end portion 104 of the mixing shaft 102 may have a diameter of ⅜ inches and the diameter of the mixing shaft recess is slightly larger than ⅜ inches so as to provide clearance for the hexagonal-shaped shaft end portion 104.

Figure 12A:
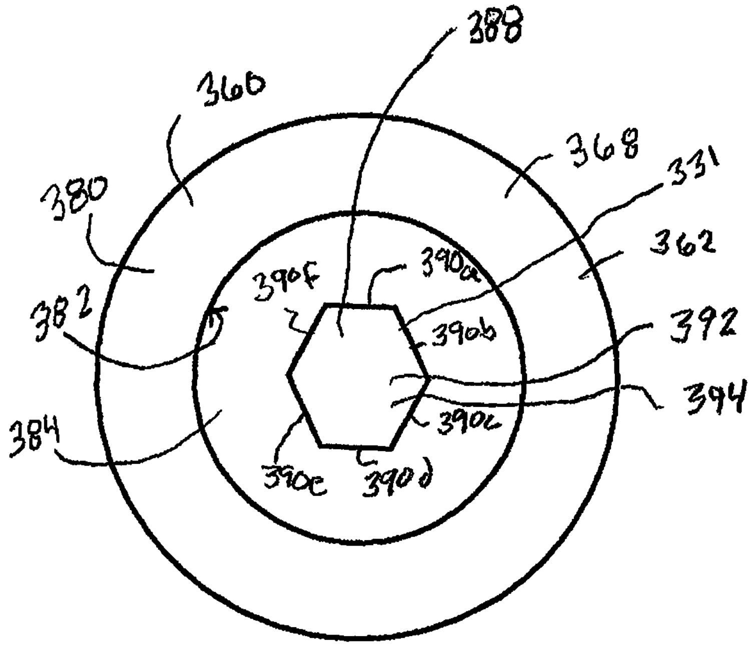
FIG. 12*a* is a top plan view of a mixing component.

As shown in FIGS. 12, 12*a* and 13 the sealed caulking tube assembly 300 also includes the mixing component 360. The mixing component 360 includes a shaft engagement portion 362 that is joined or merged with a shaftless auger portion 364. In one of the preferred embodiments the shaft engagement portion 362 and the shaftless auger portion 364 are formed or molded as a one piece body 366.

Figure 14:
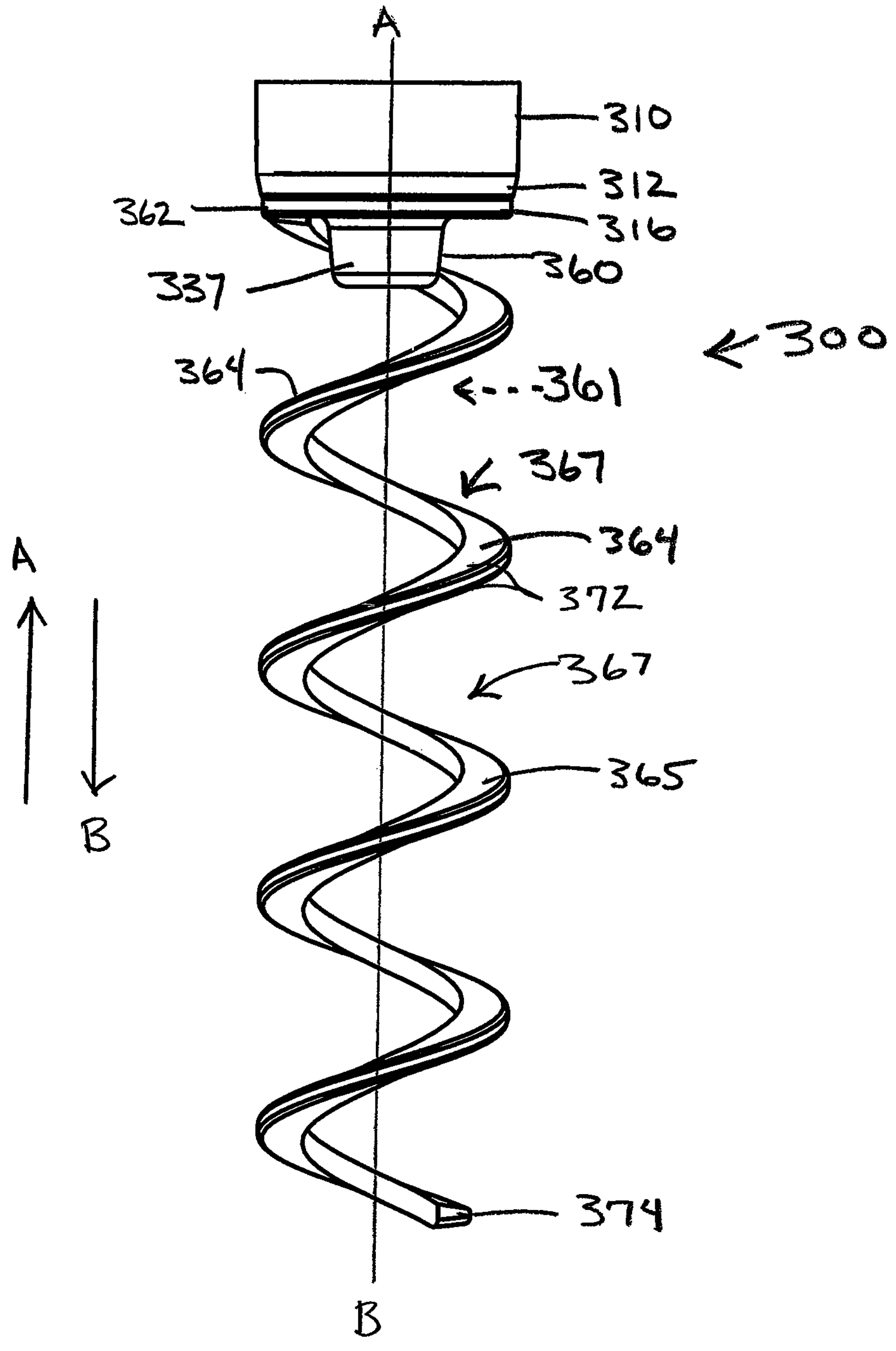
FIG. 14 is a front view of the assembled closed cap and mixing component.

The shaft engagement portion 362 has opposed first and second shaft engagement portion sides 368, 370. As shown in FIGS. 11 and 14, the shaftless auger portion 364 includes a helical blade 365. The helical blade 365 is formed with a draft 372 in one of the preferred embodiments that facilitates the molding of the mixing component 360. The shaftless auger portion 364 is joined with and extends from the second shaft engagement portion side 370 to a shaftless auger portion end 374. The shaftless auger portion 364 is made of flexible plastic in one of the preferred embodiments such that the helical blade 365 of the shaftless auger portion 364 is compressible. The helical screw blade 365 defines a hollow helical core 367, and a shaftless auger portion central axis designated B extends through the hollow helical core 367. The helical screw blade 365 of the shaftless auger portion 364 is compressible and expandable (as indicated by the arrows designated A and B in FIG. 14). In one of the preferred embodiments the helical screw blade 365 has a width of about ¼ of an inch and a thickness of about ⅛ of an inch, and can be formed with or without a draft 372.

Turning now again to the shaft engagement portion 362 of the mixing component 360, as shown in FIGS. 12 and 12*a* the first shaft engagement portion side 368 has a flat or planar engagement portion surface 380 that meets with a recessed surrounding surface 382, that in turn meets with a recessed engagement portion surface 384. The recessed surrounding surface 382 has a cylindrical shape in one of the preferred embodiments.

Joined with and extending from the first shaft engagement portion side 368 and extending in a direction toward the shaftless auger portion end 374 is a mixing component housing 387 that may be variously shaped and define variously shaped recesses, for example a rectangular shaped recess. In one of the preferred embodiments the mixing housing component 337 is a hexagonal receiving housing 388. The hexagonal receiving housing 388 includes six side walls commonly designated 390*a*, 390*b*, 390*c*, 390*d*, 390*e* and 390*f*, each of which is joined to a mixing component base wall 392. The hexagonal receiving housing 388 defines a hexagonal recess 394. As shown in FIG. 13, the hexagonal receiving housing 388 is sized to accommodate the hexagonal shaped housing portion 332 of the closed cap 310 in a close fitting manner, and the hexagonal shaped housing portion 332 and the hexagonal receiving housing 388 are interlocked and together form an interlock 391. In one of the preferred embodiments the diameter of the hexagonal recess 394 may be about 0.5 inches.

Figure 15:
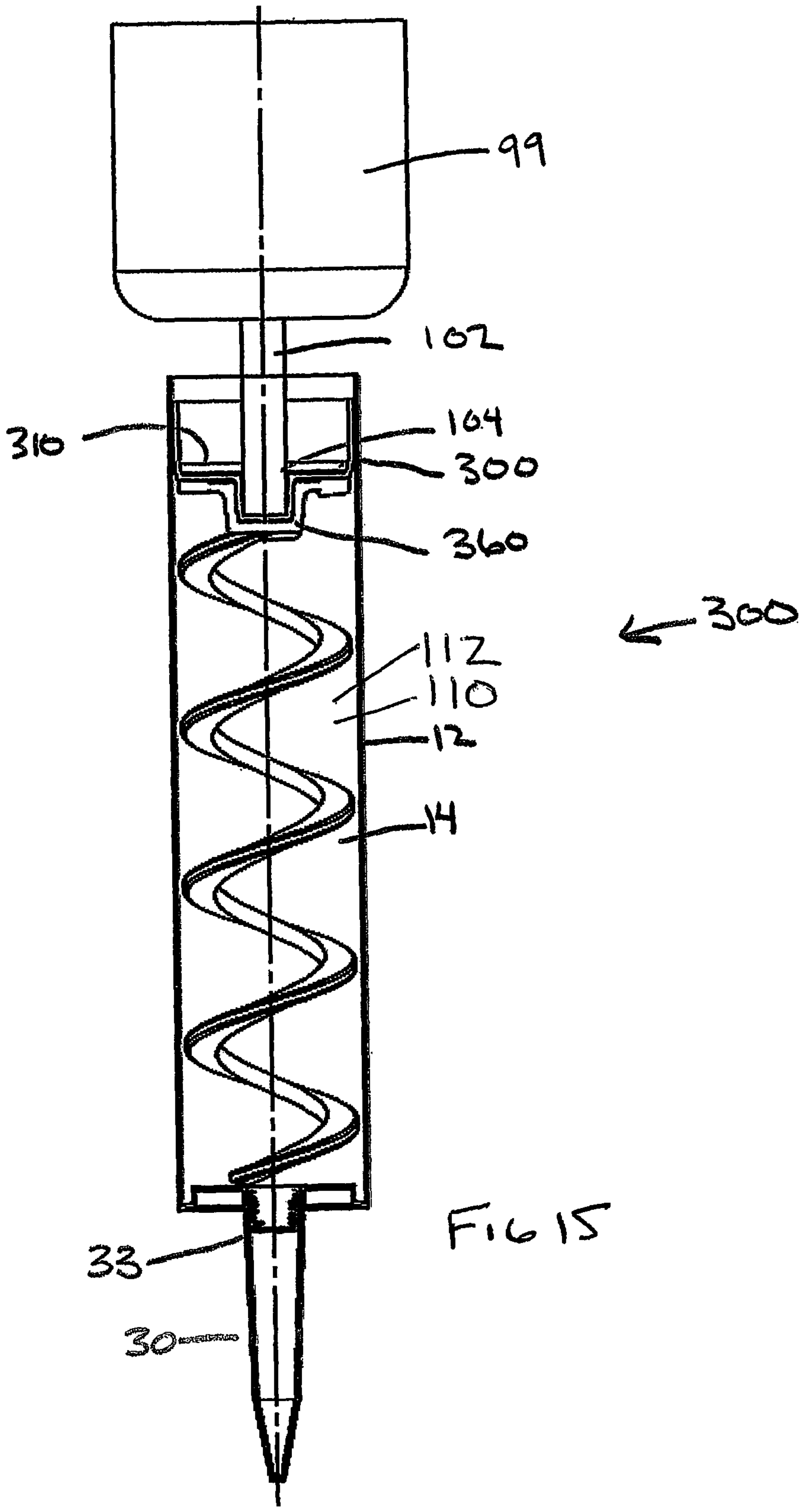
FIG. 15 is a sectional view of the sealed caulking tube assembly and a motor in engagement therewith.
Figure 16:
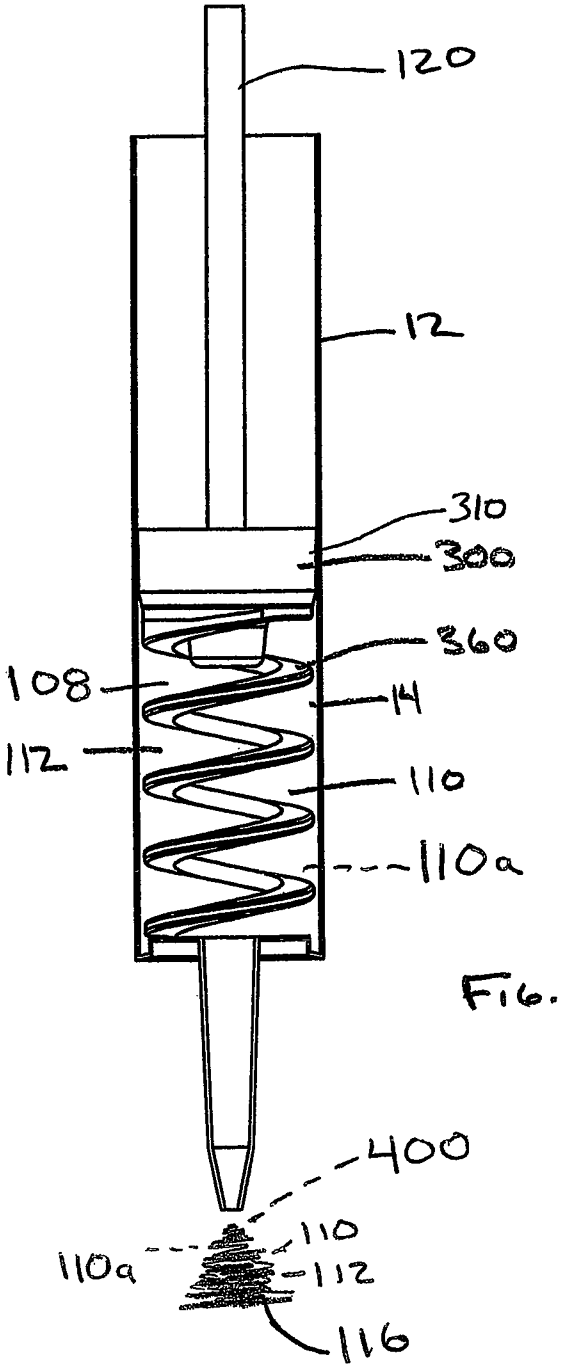
FIG. 16 is a sectional view of the sealed caulking tube assembly as caulk is dispensed out a tip by way of a caulking gun.

In use, the sealed caulking tube assembly 300 is arranged as depicted in FIG. 11. The hexagonal shaped housing portion 332 of the closed cap 310 is aligned with and moved into the hexagonal recess 394 of the hexagonal receiving housing 388. The closed cap 310 and the mixing component 360 such that they are interlocked or coupled together. Then, the removable disposable lid 200 is removed from the tube 12 filled with caulk 110. Next, the dye or a tint coloring formula or colored paint 112 is added to the tube 12. It is pointed out that in one of the preferred embodiments the dye 112 itself is a pigment that is capable of coloring paint. Next, the shaftless auger portion 364 is rotated and drilled (which can be accomplished manually) into the tube 12 containing the tint coloring formula 112 and the caulk 110 until the closed cap 310 of the sealed caulking tube assembly 300 abuts against the caulk 110 in the tube 12. As previously described there is the mixing machine 99 from which extends the mixing shaft 102, and the mixing shaft has a hexagonal cross section and a hexagonal-shaped shaft end portion 104. The hex shaft end portion 104 is sized such that it can be received in the hex shaped housing portion 332 when the caulking tube assembly 10 is fitted in a mixing machine 99. Upon rotation of the mixing shaft 102 by a source of rotation, for example a mixer motor (not shown) of the mixing machine 99, the shaftless auger portion 364 is rotated and churns the caulking 110 and a dye or a tint coloring formula 112 contained with in the tube 12 as previously described. The caulk 110 now colored is expelled from the tube 12 as shown in FIGS. 15 and 16 with the caulking gun 120. It is pointed out that the shaftless auger portion 364 is compressed as the caulk 110 is expelled.

As previously described above, in another preferred embodiment the caulk 110 is embodied as clear caulk 110*a*, that is, it has no color. In such an embodiment coloring agent 108 is one of the a dye, a tint coloring formula, or colored paint 112 that serves to color the clear caulk 110*a*.

Figure 17:
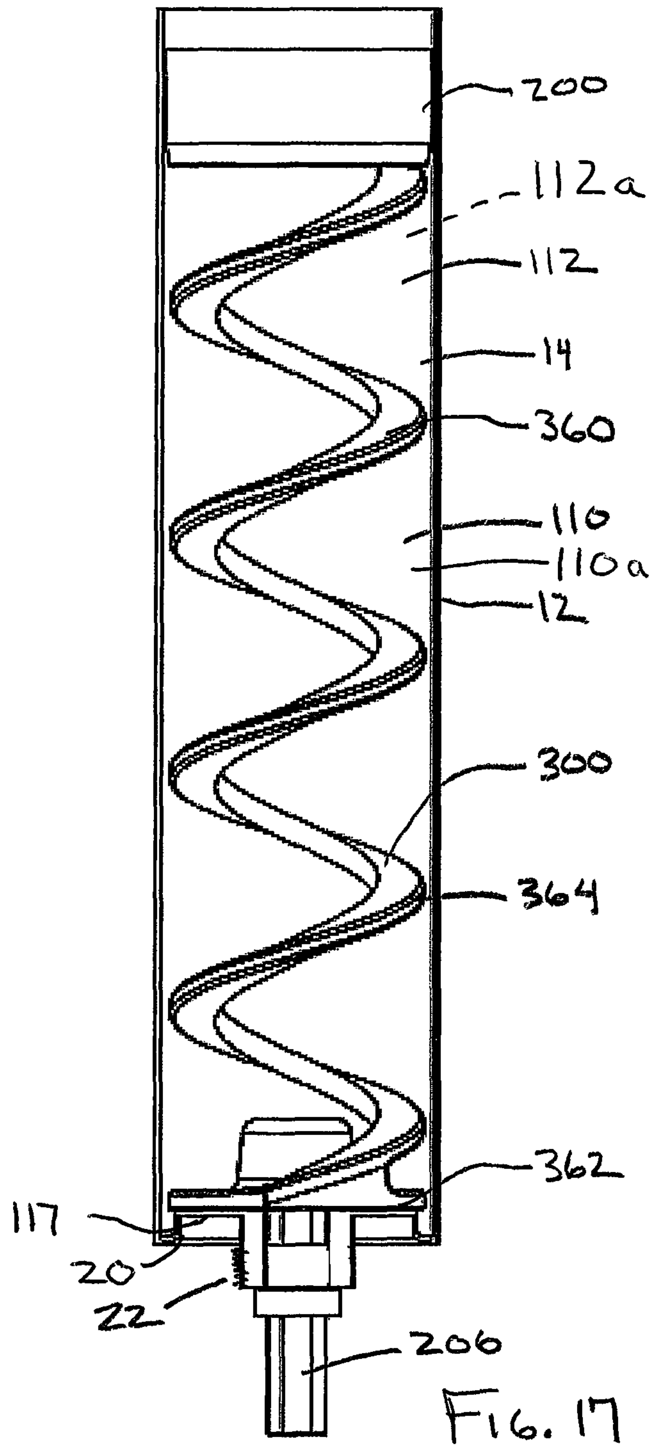
FIG. 17 is a sectional view of another embodiment depicting a tube wherein the caulking tube assembly has been pre-installation in the tube by a manufacturer.

Turning now to FIG. 17, shown therein is another preferred embodiment. In this embodiment the manufacturer (not shown) pre-installs the mixing component 360 that includes the shaft engagement portion 362 and an shaftless auger portion 364 into the tube 12 containing caulk 110. This saves the technician at the store time since he or she does not need to do this task. At the store, the removable disposable lid 200 is removed and the dye or a tint formula 112 is added to the tube 12 (or the colored paint 112*a* is added to the tube 12 if the caulk 110 is clear, that is it is colorless). Then, the removable disposable lid 200 is re-inserted into the tube 12 such that the tube 12 is sealed. The mixing shaft 206 of the mixing machine 99 moved into the hexagonal shaped housing portion 332 of the closed cap end cap 310 and rotated causing the mixing component to rotate and incorporate the dye or a tint coloring formula 112 into the caulk 110. As shown, there is a seal 117 disposed between the shaft engagement portion 362 and the end wall 20 of the tube 12. It is pointed out that the mixing machine 99 may be a hand held drill motor. After mixing the tip 30 is threaded to the externally threaded outlet port 22 and the now tinted or colored caulking 116 can be dispensed by way of a caulking gun 120.

It is pointed out that in another preferred embodiment the caulk 110 is embodied as clear caulk 110*a* that is clear when cured, that is, the clear caulk 110*a* has no color when cured. As previously mentioned, the coloring agent 108 may be one of the tint coloring formula, or colored paint 112 that serve to color the clear caulk 110_a_. The coloring agent 108 causes the caulk to have the same or substantially the same color as the coloring agent 108.

In another preferred embodiment the closed cap 310 and the mixing component 360 are made as a one piece body 361 (FIG. 14 and indicated by a dashed lead line), for example in the same mold.

It is pointed out the sealed caulking tube assembly 300 is leak-proof in that it is not possible for caulk 110 or clear caulk 110_a_ to escape during the mixing thereof, nor during the process of dispensing the caulking except through the tip 30.

It is noted that any dimensions provided for herein are for illustrative purposes and in no way limit the scope of this invention, it being understood that dimensions can be varied as required per various applications.

It is further pointed out that the above described the caulking tube assembly 10 and sealed caulking tube assembly 300 can be used to make mixed epoxy designated 400 (and referenced with a dashed line throughout the figures), as shown in FIGS. 7-9 and 16, that is made from first and second epoxy components 402, 404 (referenced with dashed line throughout the figures). Here, the coloring agent 108 is replaced with a first epoxy component 402 and the caulk is replaced with the second epoxy component 404. Thus, after mixing as described above the epoxy 400 that is mixed can be dispensed out of the tip 30 before it cures.

It will be appreciated by those skilled in the art that while the caulking tube assembly 10 and sealed caulking tube assembly 300 and methods for coloring caulking and mixing epoxy have been described in connection with particular embodiments and examples, the caulking tube assembly 10 and the sealed caulking tube assembly 300 and methods for coloring caulking and mixing epoxy are not necessarily so limited and that other examples, uses, modifications, and departures from the embodiments, examples, and uses may be made without departing from the caulking tube assembly 10 and the sealed caulking tube assembly 300 and method for coloring caulking and mixing epoxy. All these embodiments are intended to be within the scope and spirit of the appended claims.

What is claimed:

1. A method of coloring caulk comprising the acts of:

providing a tube that is filled with a caulk and providing a lid in the tube and wherein the lid is a removable and disposable lid;

removing the lid to expose the caulk in the tube;

disposing a coloring agent in the tube with the caulk;

mixing the caulk and the coloring agent until the coloring agent is dispersed into the caulk such that the tube is filled with a colored caulk;

providing a closed cap having a surrounding cap wall and a closed cap end wall that meets with the surrounding cap wall;

extending a hexagonal shaped housing portion from the closed cap end wall and providing the shaft housing portion with a shaft engagement base wall;

defining in the shaft housing portion a mixing shaft recess for receiving a mixing shaft;

providing a mixing component having a shaft engagement portion and a shaftless auger portion;

interlocking the hexagonal shaped housing portion of the closed cap with the hexagonal receiving housing of the shaft engagement portion;

screwing the shaftless auger portion into the caulk such that the shaftless auger portion is screwed into the caulk; and, inserting a mixing shaft into the hexagonal shaped housing portion of the end cap and rotating the mixing shaft to incorporate the coloring agent into the caulk in order to produce the tube filled with the colored caulk.

2. The method of coloring caulk according to claim 1 further including the acts of providing a caulk gun and providing the tube with a tip and installing the tube filled with the colored caulk in the caulk gun and dispensing the colored caulk from the tip.

3. The method of coloring caulk according to claim 1 further including a step of providing the shaftless auger portion to be a helical blade that is compressible.

4. The method of coloring caulk according to claim 2 further including the act of selling the tube filled with caulk with the closed cap and mixing component pre-installed in the tube and adding the coloring agent and carrying out the mixing at a point of sale.

5. The method of coloring caulk according to claim 1 wherein the act of providing the tube filled with caulk includes providing the caulk to be a clear caulk.

6. A method of providing a sealed caulking tube assembly for use with a tube, the method comprising the acts of:

providing a closed cap having a surrounding cap wall and a closed cap end wall that meets with the surrounding cap wall;

providing the closed cap with a shaft housing portion that extends from the closed cap end wall and wherein the closed cap is leak proof;

providing a mixing component having a shaft engagement portion and a shaftless auger portion and joining the shaft engagement portion and the shaftless auger portion and the mixing component is for mixing caulk;

interlocking the shaft housing portion of the closed cap with the shaft engagement portion of the mixing component and disposing the interlocked shaft housing portion and the mixing component in the tube; and, providing the tube with opposed first and second ends and joining an end wall to the first end of the tube and extending a tip from the end wall and the tip is for dispensing caulk such that when the closed cap disposed in the tube is moved through the tube caulk is dispensed from the tip.

7. The method of providing a sealed caulking tube according to claim 6 further comprising the acts of providing the shaft housing portion of the closed cap to be a hexagonal shaped housing portion, and providing the shaft engagement portion with a hexagonal recess, and disposing the hexagonal shaped housing portion in the hexagonal recess such that shaft engagement portion and the mixing component are interlocked.

8. A method of making a sealed caulking tube comprising the acts of:

providing a closed cap having a surrounding cap wall and a closed cap end wall that meets with the surrounding cap wall;

providing a shaft housing portion and extending the shaft housing portion from the closed cap end wall and providing the shaft housing portion with a shaft engagement base wall;

defining a mixing shaft recess in the shaft housing portion and forming the surrounding cap wall and the shaft housing portion to be impervious to fluid flow and wherein the closed cap is leakproof;

providing a mixing component having a shaft engagement portion and a shaftless auger portion and the providing the shaftless auger portion with a helical blade that extends from the shaft engagement portion and interlocking the mixing component with the shaft housing portion that extends from the closed cap end wall such that upon rotation of the shaft housing portion the shaftless auger portion rotates; and, providing a tube and disposing the closed cap and mixing component in the tube and providing the tube with opposed first and second ends and joining to the first end of the tube an end wall and extending a tip from the end wall and the tip for dispensing the contents of the tube.

9. The method of making a sealed caulking tube according to claim 8 wherein the surrounding cap wall is cylindrical shaped and defining a cap interior with the surrounding cap wall, the closed cap end wall and the hexagonal shaped housing.

10. The method of making a sealed caulking tube according to claim 8 further including forming the shaft engagement portion and the shaftless auger portion as a one piece body.

11. The method of making a sealed caulking tube according to claim 8 further providing the helical blade that extends from the shaftless auger portion with a draft.

12. The method of making a sealed caulking tube according to claim 8 further including providing the shaftless auger portion with a shaftless auger portion end such that when the shaftless auger portion is disposed in the tube the shaftless auger portion end abuts against the end wall of the tube and the shaftless auger portion is compressed as the closed cap is moved through the tube such that caulk is expelled out of the tip the shaftless auger portion is compressed.

13. The method of making a sealed caulking tube according to claim 8 further including forming the closed cap and the mixing component and shaft engagement portion as a one piece body.

* * * * *